(12) United States Patent
Koryakovskiy et al.

(10) Patent No.: US 9,654,685 B2
(45) Date of Patent: May 16, 2017

(54) CAMERA APPARATUS AND CONTROL METHOD THEREOF

(71) Applicant: Samsung Electronics Co., Ltd., Gyeonggi-do (KR)

(72) Inventors: Ivan Koryakovskiy, Gyeonggi-do (KR); Moon-Sik Jeong, Gyeonggi-do (KR); Sung-Do Choi, Gyeonggi-do (KR); Dong-Wook Kwon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/862,967

(22) Filed: Apr. 15, 2013

(65) Prior Publication Data
US 2013/0271618 A1 Oct. 17, 2013

(30) Foreign Application Priority Data

Apr. 13, 2012 (KR) .................. 10-2012-0038310
Mar. 8, 2013 (KR) .................. 10-2013-0025306

(51) Int. Cl.
*H04N 5/232* (2006.01)
*G06K 9/00* (2006.01)
*G06F 3/01* (2006.01)

(52) U.S. Cl.
CPC ......... *H04N 5/23219* (2013.01); *G06F 3/017* (2013.01); *G06K 9/00355* (2013.01);
(Continued)

(58) Field of Classification Search
CPC H04N 5/23219; H04N 5/23254; G06F 3/017; G06F 17/30032; G06T 7/20–7/2093; G06K 9/00335
(Continued)

(56) References Cited

U.S. PATENT DOCUMENTS 6,944,315 B1 9/2005 Zipperer et al.
2001/0042245 A1 11/2001 Iwamura
(Continued)

FOREIGN PATENT DOCUMENTS

CN 1685366 10/2005
CN 101686329 3/2010
(Continued)

OTHER PUBLICATIONS

Japanese Office Action dated Feb. 13, 2017 issued in counterpart application No. 2013-082754, 11 pages.
(Continued)

*Primary Examiner* — Paul Berardesca
(74) *Attorney, Agent, or Firm* — The Farrell Law Firm, P.C.

(57) ABSTRACT

A camera apparatus and method enabling a user to conveniently control an operation of the camera apparatus according to a gesture of a subject for photography input through a lens of a camera, and a method of controlling the camera apparatus are provided. The method includes generating a current frame by receiving an image input through a camera; comparing the current frame and one or more previous frames stored before the current frame and detecting a gesture of a subject for photography included in the current frame and the one or more previous frames; determining whether the gesture is a gesture UI; and when the gesture is the gesture UI, executing an operation corresponding to the gesture UI.

15 Claims, 13 Drawing Sheets

(52) U.S. Cl.
CPC ......... *H04N 5/232* (2013.01); *H04N 5/23216* (2013.01); *H04N 5/23254* (2013.01)

(58) Field of Classification Search
USPC ................. 348/240.99, 222.1; 382/103, 209; 715/863
See application file for complete search history.

(56) References Cited

U.S. PATENT DOCUMENTS

| | | | |
|---|---|---|---|
| 2004/0196400 A1 | 10/2004 | Stavely et al. | |
| 2006/0018652 A1 | 1/2006 | Sugiura et al. | |
| 2010/0040292 A1* | 2/2010 | Clarkson | G06K 9/00355 382/201 |
| 2010/0073497 A1 | 3/2010 | Katsumata et al. | |
| 2011/0013807 A1* | 1/2011 | Lee | G06K 9/00355 382/107 |
| 2011/0234854 A1 | 9/2011 | Kimura | |
| 2012/0070036 A1* | 3/2012 | Lee | 382/103 |
| 2012/0119985 A1 | 5/2012 | Kang | |
| 2014/0218283 A1* | 8/2014 | Choi et al. | 345/156 |

FOREIGN PATENT DOCUMENTS

| | | | | |
|---|---|---|---|---|
| CN | 101742114 | | 6/2010 | |
| CN | 102208014 | | 10/2011 | |
| CN | 102270035 | | 12/2011 | |
| CN | 102339125 | | 2/2012 | |
| CN | 102467235 | | 5/2012 | |
| JP | 2000138858 | * | 5/2000 | ............ H04N 5/232 |
| JP | 2000-200267 | | 7/2000 | |
| JP | 2001-111881 | | 4/2001 | |
| JP | 2010/028446 | | 2/2010 | |
| JP | 2012-015661 | | 1/2012 | |
| KR | 1020110060296 | | 6/2011 | |
| KR | 1020130076346 | | 7/2013 | |
| WO | WO 2010/1085221 | | 7/2010 | |
| WO | WO 2012/011614 | | 1/2012 | |

OTHER PUBLICATIONS

European Search Report dated Feb. 14, 2017 issued in counterpart application No. 13163698.7-1902, 8 pages.
Chinese Office Action dated Mar. 3, 2017 issued in counterpart application No. 201310128697.6, 14 pages.

* cited by examiner

CAMERA APPARATUS AND CONTROL METHOD THEREOF

PRIORITY

This application claims priority under 35 U.S.C. §119(a) to Korean Application Serial No. 10-2012-0038310, which was filed in the Korean Intellectual Property Office on Apr. 13, 2012, and to Korean Application Serial No. 10-2013-0025306, which was filed in the Korean Intellectual Property Office on Mar. 8, 2013, the entire contents of which are incorporated herein by reference.

BACKGROUND OF THE INVENTION

1. Field of the Invention

The present invention generally relates to a camera apparatus and method thereof, and more particularly, to a camera apparatus for enabling a user to conveniently control an operation of the camera apparatus according to a gesture of a subject for photography input through a lens of a camera, and a method of controlling the camera apparatus.

2. Description of the Related Art

In general, the term "digital image processing apparatus" includes all apparatuses capable of processing an image of an image acquisition device including, for example, a digital camera, a Personal Digital Assistant (PDA), a camera of a mobile phone, a PC camera or an image recognition sensor. The digital image processing apparatus may, for example, process an image input by the image acquisition device using a digital signal processor, compress the processed image, generate an image file, and store the image file in a memory.

Presently, a primary class of users of digital cameras has expanded from a small number of experts to the general public, so that an age of the primary class and a usage field has expanded. For example, an age group of 10 to 30 year olds frequently use digital cameras and often use a self photographing method to photograph themselves. However, when a user takes a picture by using the self photographing method, the user also serves as a subject for photography. In this case, the user must adjust a focus of a lens of a camera and press a shutter of the camera, and thus it is difficult to take a picture. In addition, there are many cases in which the lens is disposed on a front surface of the digital camera, but a menu button for changing a setting of the camera is located on a rear surface of the camera. In the case in which the user takes a picture using the self photographing method, the user serves as the subject for photography and must, therefore, be positioned in front of the lens of the camera. As a result, it is difficult for the user to use a function of the digital camera in a desired manner during the photographing.

SUMMARY OF THE INVENTION

The present invention has been made to address at least the problems and disadvantages described above, and to provide at least the advantages described below. Accordingly, an aspect of the present invention provides a camera apparatus enabling a user to conveniently control an operation of a camera apparatus according to a gesture of a subject for photography input through a lens of a camera, and a method of controlling the camera apparatus.

In accordance with an aspect of an embodiment of the present invention, a method of controlling a camera apparatus is provided. The method includes generating a current frame by receiving an image input through a camera; comparing the current frame and one or more previous frames stored before the current frame and detecting a gesture of a subject for photography included in the current frame and the one or more previous frames; determining whether the gesture is a gesture user input (UI); and when the gesture is the gesture UI, executing an operation corresponding to the gesture UI.

In accordance with an aspect of another embodiment of the present invention, a camera apparatus is provided. The camera apparatus includes a camera for generating a current frame by receiving an image input from outside of the camera; a gesture recognition unit for comparing the current frame with one or more previous frames stored before the current frame and detecting a gesture of a subject for photography included in the current frame and the one or more previous frames; and a controller for determining whether the gesture is a gesture UI and, when the gesture is the gesture UI, executing an operation corresponding to the gesture UI.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description of the present invention, a detailed description of known functions and configurations incorporated herein will be omitted when it may obscure the subject matter of the present invention.

Figure 1:
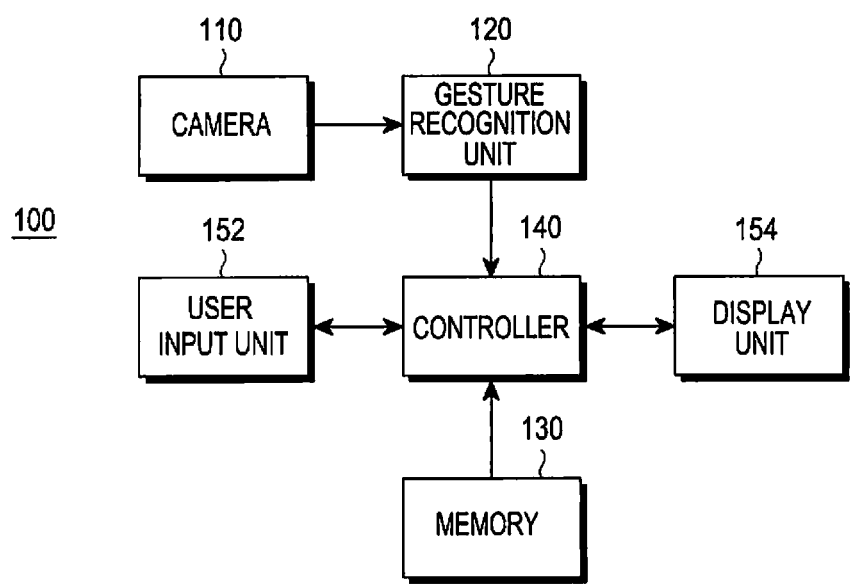
FIG. 1 is a block diagram illustrating a configuration of a camera apparatus according to an embodiment of the present invention.

FIG. 1 is a block diagram illustrating a configuration of a camera apparatus according to an embodiment of the present invention.

Referring to FIG. 1, the camera apparatus 100 includes a camera 110, a gesture recognition unit 120, a memory 130, and a controller 140. The camera apparatus 100 may further include a user input unit 152 and a display unit 154.

The camera 110 receives an input through a lens (not shown) included therein. According to the present embodiment, the camera 110 may receive an input of a gesture UI generated according to a movement of a user of the camera apparatus 100 or a subject for photography photographed by the camera apparatus 100. Further, the camera 110 may convert an image input through the lens in real time to generate an image frame. The camera 110 may store or temporarily store images, which are continuously input through the lens by a frame unit, in the memory 130 in real time.

Hereinafter, the image frame converted from a currently input image among image frames generated by the camera 110 will be referred to as a "current frame," and an image frame generated before the generation of the current frame will be referred to as a "previous frame."

The gesture recognition unit 120 detects a movement (i.e., a gesture) of the user or the subject for photography from an image input through the camera 110. The gesture recognition unit 120 may determine the gesture of the user or the subject for photography by comparing the current frame and one or more previous frames generated by the camera 110.

The gesture recognition unit 120 may detect the user or the subject for photography from image frames which are generated in real time through the camera 110, that is, from the current frame and the previous frames under a control of the controller 140. For each of the image frames, the gesture recognition unit 120 may generate frame data including, for example, a contour line, brightness, chroma, color, and coordinates, of various objects included in each of the image frames. The gesture recognition unit 120 may detect the subject for photography by using the frame data for each of the image frames. The gesture recognition unit 120 may determine that an object whose contour line, brightness, chroma, colors, and coordinates have not changed for at least a predetermined number of the image frames is the subject for photography under the control of the controller 140.

In the present invention, "the user" refers to a person desiring to take a photograph by using the camera apparatus 100 and "the subject for photography" refers to a person photographed by the camera apparatus 100. In the present invention, the subject for photography may include the user of the camera apparatus 100.

According to the embodiment, the gesture recognition unit 120 may detect a movement region from the image frame under the control of the controller 140. The "movement region" refers to a main region in which the gesture from the subject for photography is detected. The movement of the subject for photography is the largest or most frequent movement in the movement region. The gesture recognition unit 120 may detect the movement region by comparing at least two image frames with each other. For example, the recognition unit 120 detects a part of the image frame, in which a hand or body part of the subject for photography having the largest movement is moved, as the movement region.

When the movement region is detected, the gesture recognition unit 120 may predict a movement trace of the subject for photography in the movement region under the control of the controller 140. In some cases, some of the gestures of the subject for photography may not input through the lens of the camera 110 according to the movement of the subject for photography. For example, when the subject for photography draws a circle with a hand, a part of the circle drawn by the subject for photography may be outside of an area of view so that it may not be input through the camera 110. To address this issue, the gesture recognition unit 120 may predict the movement trace of the subject for photography. For example, assuming that the subject for photography draws the circle with a right hand in the previous frames, the gesture recognition unit 120 can (a) detect a region, in which the right hand moves by the subject for photography, as the "movement region," and (b) sense that the right hand of the subject for photography draws the circle in the movement region. Accordingly, the gesture recognition unit 120 may predict the trace of the movement of drawing the circle by the right hand of the subject for photography (i.e., the gesture of the subject for photography) at a point outside of the view area of the camera 110 under the control of the controller 140.

According to the embodiment, the gesture recognition unit 120 first identifies the movement of the subject for photography generated in the movement region as the gesture under the control of the controller 140. When the movement region is determined, the gesture recognition unit 120 determines the movement trace of the subject for photography in the movement region based on at least two image frames generated by the camera 110. The determined movement trace becomes the gesture input from the subject for photography.

Further, the gesture recognition unit 120 may predict the movement trace of the subject for photography based on at least two image frames. The predicted movement trace may also be determined as the gesture and input to the camera apparatus 100.

According to the embodiment, the gesture recognition unit 120 detects the gesture of the subject for photography input from a region other than the movement region. After the movement region is already determined, the movement input from the subject for photography through the camera 110 may be predominantly present in the region other than the movement region. In this case, in order to accurately receive the gesture of the subject for photography, it is preferable to reset the movement region. The gesture recognition unit 120 identifies the region other than the movement region as a new movement region under the control of the controller 140.

For example, assuming that a first region is already set as the movement region and that the movement of the subject for photography is predominantly present in the region other than the first region (i.e., a second region among the image frames generated through the camera 110), the gesture recognition unit 120 may experience difficulty in recognizing the movement of the subject for photography as the gesture when the movement of the subject for photography is larger in the second region. The gesture recognition unit 120 can transmit movements in both the first region and the second region to the controller 140. The controller 140 compares the movements in the first region and the second region. As a result of the comparison, when the movement in the second region is larger or more frequent, the controller 140 identifies the second region as the movement region. Further, the gesture recognition unit 120 detects the gesture of the subject for photography mainly in the second region which is newly set as the movement region under the control of the controller 140.

Various data for controlling the operation of the camera apparatus 100 is stored in the memory 130. The image frames input through the camera 110 in real time may be stored or temporarily stored in the memory 130. Further, various gesture UIs and the commands or operations of the camera apparatus 100 corresponding to the gesture UI may be stored in the memory 130.

The "gesture UI" refers to a gesture among the movements of the subject for photography detected by the gesture recognition unit 120 for executing a specific command or operation by the camera apparatus 100. In other words, the gesture UI includes user inputs that are inputted from the subject for photography through the camera 110. The gesture UI includes, for example, a gesture for zoom-in, zoom-out, shoot, shutter speed increase/decrease, ISO increase/decrease, white balance adjustment, focus position adjustment, continuous or discontinuous shoot, color temperature adjustment, whether to use a flash, and selection of a shoot mode. The shoot mode includes, for example, at least one of an Auto Exposure (AE) mode, a shutter priority AE mode, an aperture priority AE mode, a manual exposure mode, and a bulb exposure mode.

The memory 130 according to the embodiment stores a reference value for setting the movement region and a threshold for limiting a zoom-in magnification of the camera (i.e., a threshold magnification).

The controller 140 controls the general operation of the camera apparatus 100. According to the embodiment, the controller 140 determines whether the gesture of the subject for photography detected by the gesture recognition unit 120 is the gesture UI and identifies the movement of the subject for photography. When the gesture recognized by the gesture recognition unit 120 is the gesture UI, the controller 140 controls the camera apparatus 100 such that an operation corresponding to the corresponding gesture UI is performed.

When the subject for photography is detected by the gesture recognition unit 120, the controller 140 controls the gesture recognition unit 120 to detect the movement region. According to the embodiment, under the control of the controller 140, the gesture recognition unit 120 compares a current frame with at least one previous frame and converts a degree of the movement into a numerical value by dividing the movement for each region of the image frame in which the movement is generated. At this time, it is assumed that the movement is frequent as the numerical value converted from the movement degree increases. The gesture recognition unit 120 identifies a region having a value greater than or equal to the reference value pre-stored in the memory 130 among regions of which movement degrees are converted into numerical values as the movement region. According to the embodiment, the gesture recognition unit 120, under the control of the controller 140, can determine that a region having the highest value among the regions having the value greater than or equal to the reference value is the movement region. The controller 140 controls the gesture recognition unit 120 to first detect the gesture of the subject for photography sensed in the movement region.

According to another embodiment, the gesture recognition unit 120 detects the gesture of the subject for photography from another region other than the movement region. The controller 140 calculates reliability of the gesture of the subject for photography in the movement region and reliability of the gesture of the subject for photography in another region. At this time, the reliability may be an index indicating a probability that the gesture in the movement region or another region is the gesture UI. The reliability can be calculated based on at least one of the numerical value converted from the movement degree, accuracy of the gesture, and whether the gesture is generated in the movement region. In the embodiment, the reliability becomes higher as a position where the gesture of the subject for photography is generated is closer to the movement region and the accuracy of the gesture is higher.

The controller 140 calculates the reliability in each of the movement region and another region to identify the region having the higher reliability as the movement region. For example, assuming that the reliability of the existing movement region is 0.8 and the reliability of another region is 0.9, the controller 140 identifies the other region as the movement region and controls the gesture recognition unit 120 to detect the gesture of the subject for photography mainly in the newly identified movement region.

According to the embodiment, the controller 140 determines whether the gesture UI detected by the gesture recognition unit 120 corresponds to the zoom-in operation. When the gesture UI corresponds to the zoom-in operation, the controller 140 determines whether to perform the zoom-in operation based on a current magnification of the camera 110 or on a total magnification of the camera 110. In the embodiment, it is assumed that when the camera 110 reaches the threshold magnification pre-stored in the memory 130, the controller 140 prevents the camera apparatus 100 from performing any further zoom-in operations. When the current magnification of the camera 110 is the threshold magnification, the controller 140 prevents the camera 110 from performing the zoom-in operation even though a zoom-in gesture is input from the subject for photography through the camera 110. Further, when a zoom-in magnification, in a case where the zoom-in operation corresponding to the zoom-in gesture is performed through the camera 110, exceeds the threshold magnification, the controller 140 can control the camera to perform the zoom-in operation to return the zoom-in magnification to the threshold magnification.

For example, the threshold magnification may be a maximum magnification which allows the gesture UI to be inside an angle of view of the camera 110. For example, in a scenario in which the gesture UI is not outside the angle of view of the camera 110 if the zoom-in magnification is four times but is outside the angle of view of the camera 110 if the zoom-in magnification is five times, the threshold magnification is four times.

Further, according to the embodiment, the controller 140 prevents the camera apparatus 100 from further performing the zoom-in operation even though the gesture UI recognized by the gesture recognition unit 120 is outside of the angle of view of the camera 110.

The user input unit 152 receives a user's input that is input in the camera apparatus 100. According to the present embodiment, the user input unit 152 receives the user's input for receiving the gesture UI.

According to the embodiment, the input unit 152 receives the user input for determining the movement region. The display unit 154 of the camera apparatus 100 according to the embodiment separately displays at least a partial region of the image frame displayed through the display unit 154 as a movement prediction region when the camera 110 is driven. At this time, the region displayed as the movement prediction region on the display unit 154 is a region in which the movement is predicted to be generated (e.g., a region in which the hand of the subject for photography is detected). The user input unit 152 receives the user input for selecting or identifying the movement prediction region displayed through the display unit 154. By presetting the movement prediction region, the gesture recognition unit 120 detects the movement of the subject for photography primarily in the movement prediction region. Further, by presetting the movement prediction region, the gesture recognition unit 120 reduces calculation processes for detecting the movement region.

The display unit 154 displays various data relating to the camera apparatus 100. According to the embodiment, the display unit 154 may display an image input in real time through the lens of the camera 110 by using, for example, a screen included therein. Further, the display unit 154 may display a picture file stored in the memory 130.

According to the embodiment, the display unit 154 separately displays the movement region on the screen (not shown) displaying the image frame generated in real time through the camera 110 (i.e., the current frame). Further, the display unit 154 can separately display at least a partial region of the image frame as the movement prediction region when the camera 110 is driven.

According to the embodiment, when the display unit 154 is implemented in a form of touch screen, the display unit 154 receives a touch input from the user through the touch screen (i.e., the user input). Accordingly, the display unit 154 can receive the touch input for selecting the movement prediction region from the user.

Figure 2:
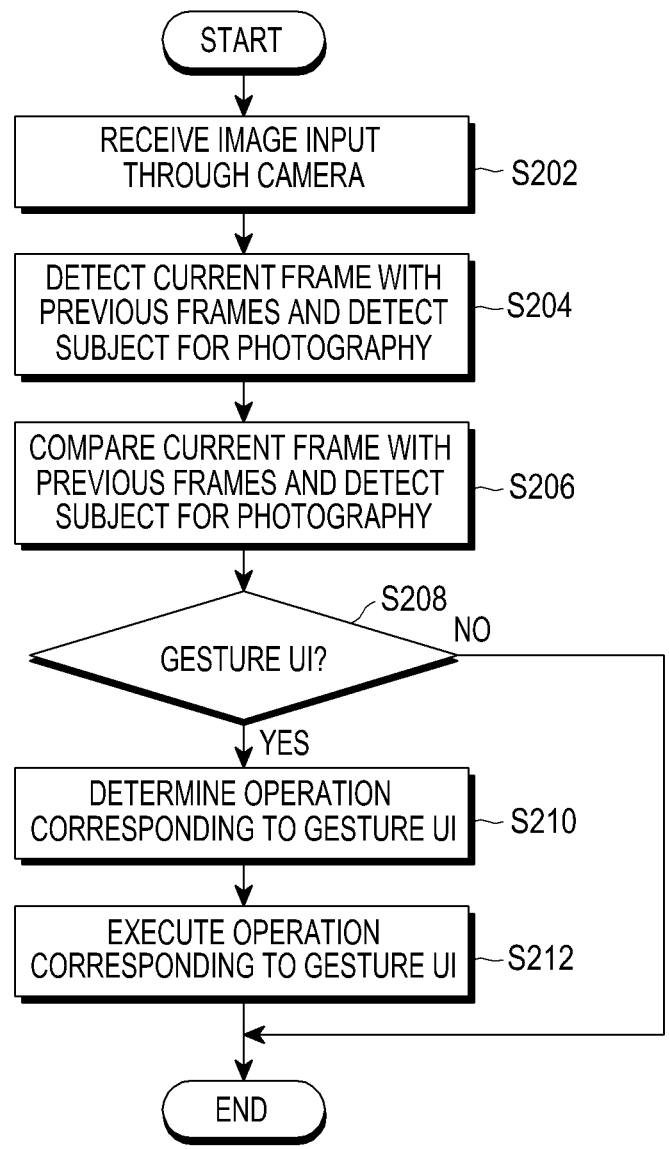
FIG. 2 is a flowchart illustrating a method of controlling the camera apparatus illustrated in FIG. 1.

FIG. 2 is a flowchart illustrating a method of controlling the camera apparatus 5 illustrated in FIG. 1.

Referring to FIG. 2, in step S202, the camera apparatus 110 receives an input through the camera 110. The camera 110 generates an image frame by using the image input in step S202, and transfers the generated image frame to the gesture recognition unit 120.

At step S204, the gesture recognition unit 120 compares the current frame with one or more previous frames to detect a subject for photography included in the current frame and the one or more previous frames.

Subsequently, at step S206, the gesture recognition unit 120 detects a gesture of the subject for photography detected in step S204.

When the gesture of the subject for photography is detected in step S206, the controller 140 determines whether the gesture of the subject for photography detected in step S206 is a gesture UI in step S208. The memory 130 according to the embodiment stores one or more gestures. When the gesture detected in step S206 is the same gesture as the gesture stored in the memory 130 as the gesture UI, the controller 140 identifies the gesture detected in step S206 as the gesture UI. In contrast, when the gesture detected in step S206 is not the same gesture as the gesture stored in the memory 130 as the gesture UI, the controller 140 determines that the gesture detected in step S206 is not the gesture UI.

When, at step S208, the gesture of the subject for photography is identified as the gesture UI (S208: yes), the controller 140 determines an operation corresponding to the detected gesture UI in step S210. The memory 130 can store at least one gesture UI and a command or operation corresponding to the gesture UI. The controller 140 may determine the command or operation corresponding to the gesture UI input from the subject for photography by searching the memory 130.

When the operation corresponding to the gesture UI is determined, the controller 140 executes the operation corresponding to the gesture UI by controlling the camera apparatus 100 at step S212.

When the gesture of the subject for photography is not the gesture UI as a result of the determination in step S208 (S208: no), the controller 140 controls the camera apparatus 100 to maintain a standby state without performing any operation.

Figure 3:
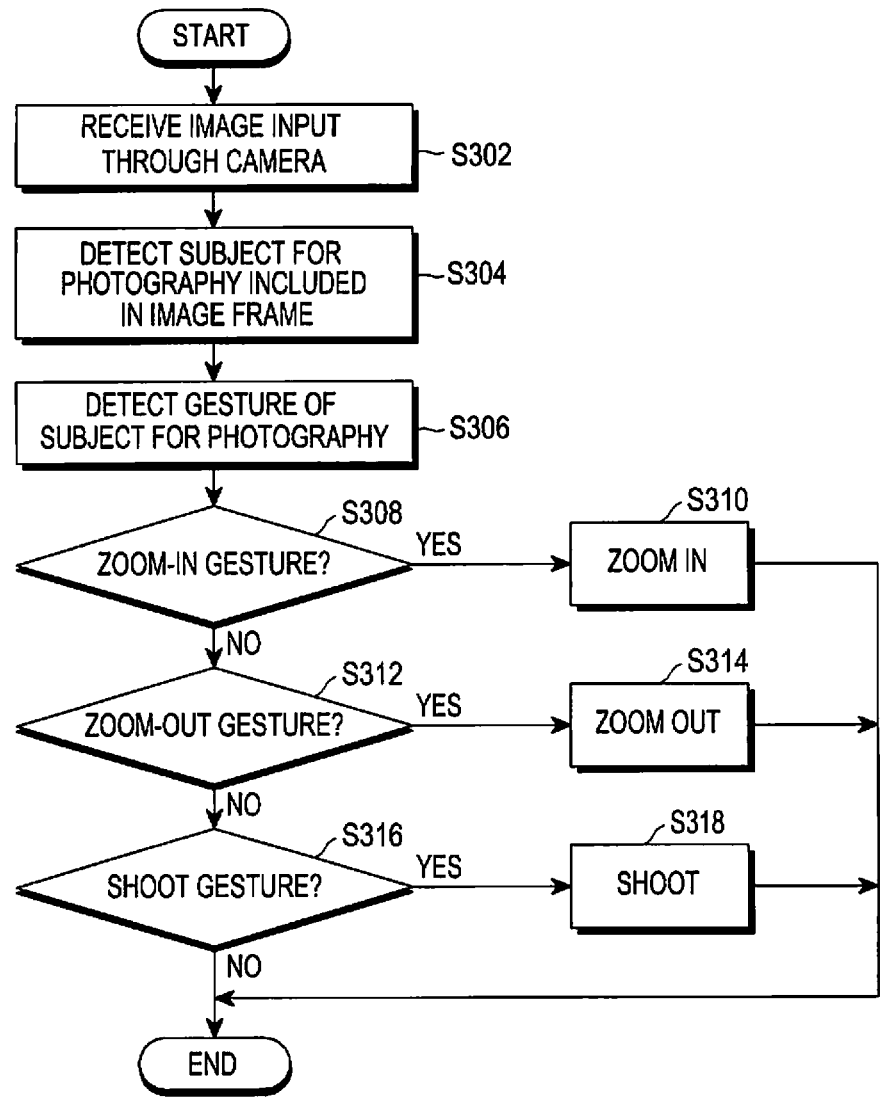
FIG. 3 is a flowchart illustrating another method of controlling the camera apparatus illustrated in FIG. 1.

FIG. 3 is a flowchart illustrating another method of controlling the camera apparatus illustrated in FIG. 1.

Referring to FIG. 3, first, the camera apparatus 110 receives an input through the camera 110 at step S302. The camera 110 generates an image frame by using the image input in step S302, and transfers the generated image frame to the gesture recognition unit 120. As previously noted, the generated image frame is referred to as the "current frame", and the image frame generated before the current frame is referred to as the "previous frame."

In step S304, the gesture recognition unit 120 detects a subject for photography included in the image frame. Further, in step S306, the gesture recognition unit 120 detects a movement of the subject for photography detected in step S304 by comparing one or more previous frames and the current frame.

In step S308, when the movement of the subject for photography is detected, the controller 140 determines whether the movement of the subject for photography detected in step S306 is a zoom-in gesture. When, in step S308, it is determined that the movement of the subject for photography is the zoom-in gesture, the controller 140 performs a zoom-in operation by controlling the camera apparatus 100 in step S310.

When, in step S308, it is determined that the movement of the subject for photography is not the zoom-in gesture, the controller 140 determines whether the movement of the subject for photography detected in step S306 is a zoom-out gesture at step S312. When, in step S312, it is determined that the movement of the subject for photography is the zoom-out gesture, the controller 140 performs a zoom-out operation by controlling the camera apparatus 100 in step S314.

When, in step S312, it is determined that the movement of the subject for photography is not the zoom-out gesture, the controller 140 determines whether the movement of the subject for photography detected in step S306 is a shoot gesture in step S316. When, in step 316, it is determined that the movement of the subject for photography is the shoot gesture, the controller 140 performs a shoot operation by controlling the camera apparatus 100 in step S318. Accordingly, the camera 110 may convert the image frame (i.e., the current frame) input through the lens to an image file and store the converted image file in the memory 130. Further, the camera apparatus 100 may display the image file stored in the memory 130 through the display unit 154 under the control of the controller 140.

When, in step S316, it is determined that the detected movement is not the shoot gesture (S316: no), the controller 140 controls the camera apparatus 100 to maintain a standby state without performing any operation.

In the present embodiment, the controller 140 determines the type of gesture UI in a sequence by first determining whether the movement of the subject for photography detected in step S306 is the zoom-in gesture, then determining whether the movement is the zoom-out gesture, and then determining whether the movement is the shoot gesture. However, it should be noted that the controller 140 may determine the type of gesture UI according to a different sequence depending on another embodiment. Further, according to another embodiment, the controller 140 may search for the same gesture UI as the movement of the subject for photography detected in step S306 in the memory 130.

Figure 4:
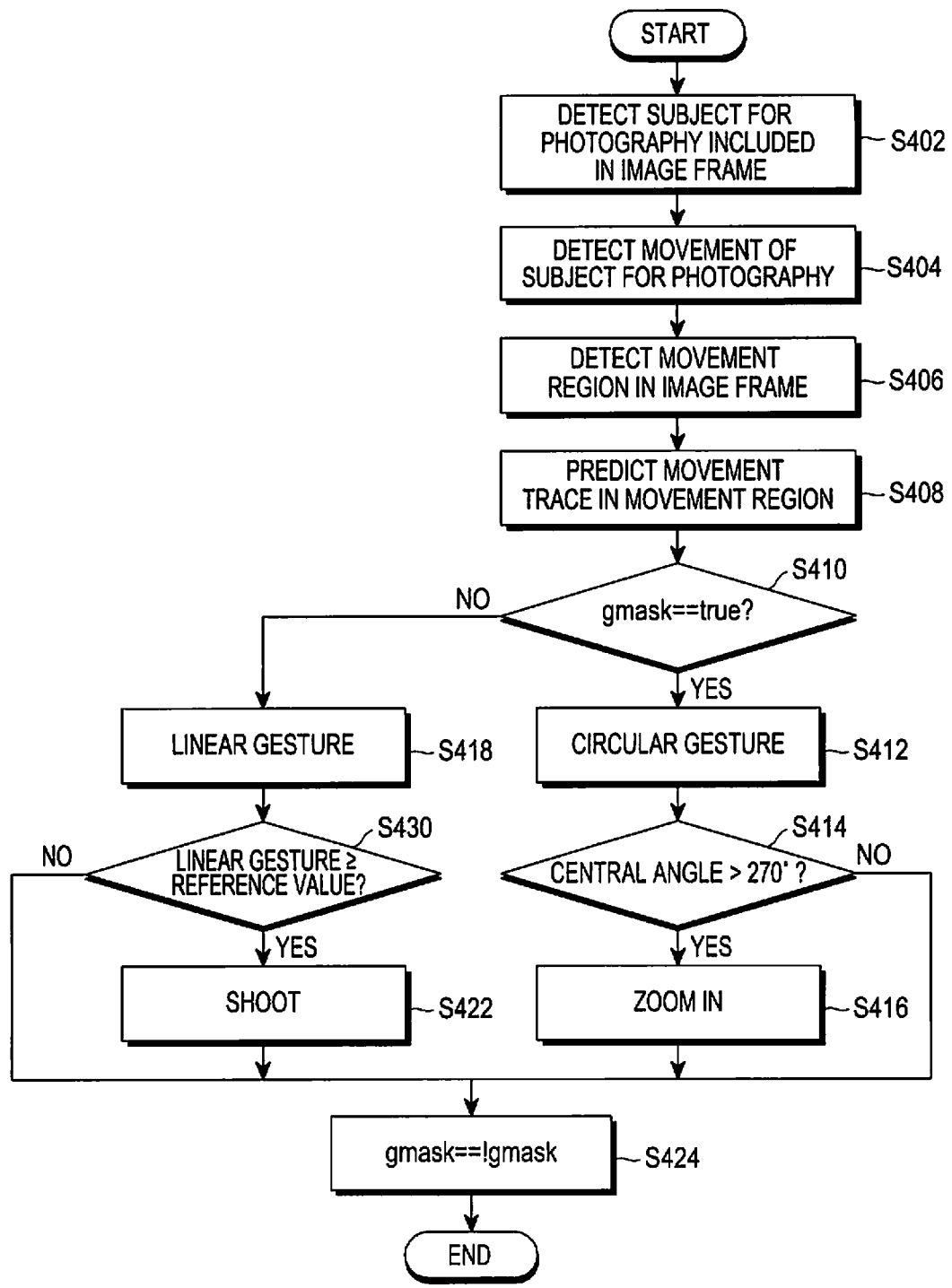
FIG. 4 is a flowchart illustrating another method of controlling the camera apparatus illustrated in FIG. 1.

FIG. 4 is a flowchart illustrating another method of controlling the camera apparatus illustrated in FIG. 1. In FIG. 4, it is assumed that an initial value (gmask) for determining the type of gesture UI of the subject for photography input through the camera 110 is true (=1). Further, it is assumed that a circular gesture is a gesture UI for a zoom-in operation, and a linear gesture is a gesture UI for a shoot operation.

Referring to FIG. 4, in step S402, the camera apparatus 110 receives an input through the camera 110. The camera 110 generates an image frame by using the image input in step S402, and transfers the generated image frame (i.e., current frame) to the gesture recognition unit 120. In step S404, the gesture recognition unit 120 detects a subject for photography included in the image frame based on the current frame and the previous frames pre-stored in the memory 130. In step S406, the gesture recognition unit 120 detects a movement region in the image frame. When the movement region is detected, the gesture recognition unit 120 predicts a movement trace of the subject for photography in the movement region in step S408. The "movement trace" refers to a movement route along which at least a part of the subject for photography moves within the image frame. The gesture recognition unit 120 may predict the movement of the subject for photography within the movement region by using the movement regions of the subject for photography in the previous frames and the current frames.

In step S410, the controller 140 determines whether the initial value (gmask) is true (=1). When, in step S410, it is determined that the initial value (gmask) is true (S410: yes), the controller 140 determines that the detected movement of the subject for photography detected in step S404 is a circular gesture in step S412. The circular gesture refers to a circular movement of at least a part the subject for photography input through the lens of the camera 110. The subject for photography may input the circular gesture in the camera 110 by performing a motion of drawing a circle or an oval by using the subject's hand.

In step S414, the controller 140 determines whether a central angle of the circular gesture (i.e., the circle drawn by the subject for photography) is 270°. In order to identify the circle drawn by the subject for photography as the circular gesture even when the subject for photography incompletely draws the circle or a part of the circle drawn by the subject for photography is outside of the view angle of the lens, the determination, in step S414, of whether the central angle of the circle is 270° is performed. That is, the central angle of 270° of the circle is a reference value for determining whether the movement input by the subject for photography is a movement included in the gesture UI. According to the embodiment, the central angle of the circle may be various values, such as 180° or 360°. Further, the central angle is an angle that is a center angle of an arc of the circle drawn by the subject for photography with respect to the center of the circle.

When, in step S414, it is determined that the central angle is greater than or equal to 270° (S414: yes), the controller 140 performs a zoom-in operation by controlling the camera apparatus 100 in step S416. Subsequently, the controller 140 changes the initial value (gmask) to an opposite value in step S422. Since the initial value (gmask) is true (=1) in step S410, the controller 140 changes the initial value (gmask) in step S424 to false (=0).

When, in step S410, it is determined that the initial value (gmask) is not true (=1) (S410: no), that is, the initial value (gmask) is false (=0), the controller 140 determines, in step S418, that the movement of the detected subject for photography detected in step S404 is a linear gesture. The linear gesture refers to a gesture that is a linear movement of at least a part of the subject for photography input through the lens of the camera 110. The subject for photography may input the linear gesture in the camera 110 by drawing a straight line from a left side to a right side or a right side to a left side using the subject's hand. Further, the subject for photography may input the linear gesture in the camera 110 by drawing a straight line from a top side to a bottom side or a bottom side to a top side using the subject's hand.

In step S420, the controller 140 determines whether the linear gesture is equal to or larger than a reference value. In this case, in order to identify the straight line drawn by the subject for photography as the linear gesture even when the subject for photography incompletely draws the straight line or a part of the straight line is outside of the view angle of the lens during the drawing of the straight line, the determination of whether the linear gesture is equal to or larger than the reference value is performed. For example, assuming that the straight line drawn from a left side to a right side by the subject for photography using the subject's hand is the linear gesture, when the straight line drawn by the subject for photography is 80 cm or longer, the controller 140 of the camera apparatus 100 may determine the straight line as the linear gesture. Accordingly, the reference value may be 80 cm in step S420.

When, in step S420, it is determined that the linear gesture is greater than or equal to the reference value (S420: yes), the controller 140 performs a shoot operation by controlling the camera apparatus 100 in step S422. Then, at step S424 the controller 140 changes the initial value (gmask) to an opposite value (S424). Since the initial value (gmask) is false (=0) in step S410, the controller 140 changes the initial value in step S424 to true (=1).

FIGS. 5A to 5D illustrate gestures according to an embodiment of the present invention. In FIGS. 5A to 5D, it is assumed that the subject for photography is a user using the camera apparatus 100.

Figure 5A:
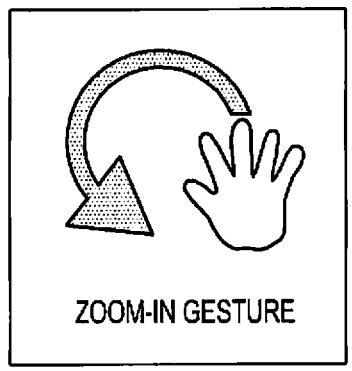
FIGS. 5A and 5D illustrate gestures according to an embodiment of the present invention.
Figure 5B:
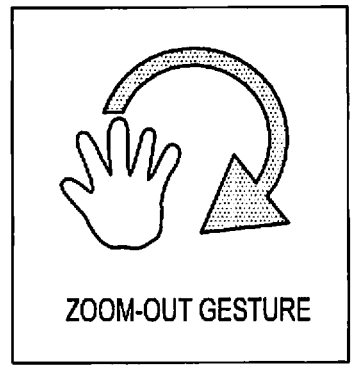

FIG. 5A illustrates a zoom-in gesture for executing a zoom-in operation and FIG. 5B illustrates a zoom-out gesture for executing a zoom-out operation. When the user performs the zoom-in gesture of rotating the hand in a counterclockwise direction, the controller 140 performs the zoom-in operation by sensing the zoom-in gesture. When the user performs the zoom-out gesture of rotating the hand in a counterclockwise direction, the controller 140 performs the zoom-out operation by sensing the zoom-out gesture.

Figure 5C:
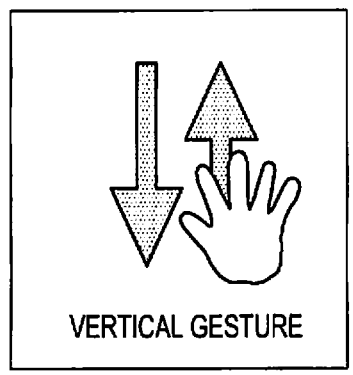
Figure 5D:
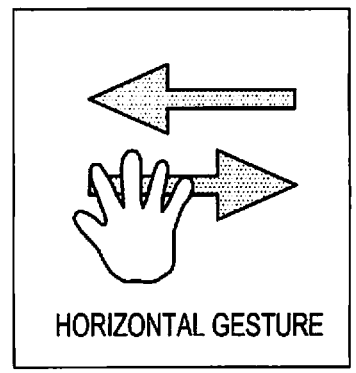

FIGS. 5C and 5D are a vertical gesture and a horizontal gesture for performing the shoot operation. When the user performs the vertical gesture of moving the hand up and then down, or moving down and then up, the controller 140 performs the shoot operation by sensing the vertical gesture. Further, when the user performs the horizontal gesture of moving the hand from a right side to a left side and then moving the hand from the left side to the right side again or moving the hand from a left side to a right side and then moving the hand from the right side to the left side again, the controller 140 performs the shoot operation by sensing the horizontal gesture.

As described above, the user may zoom in or zoom out the magnification of the lens of the camera apparatus 100 or control the camera apparatus 100 so as to shoot the user himself/herself without a direct manipulation of pressing a button or touching a touch screen included in the camera apparatus 110 by performing the movement according to the gesture UIs illustrated in FIGS. 5A to 5D.

Figure 6A:
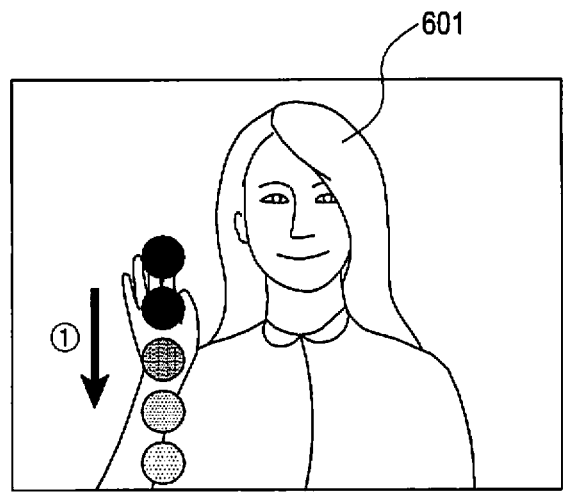
FIGS. 6A and 6B illustrate gestures of a subject for photography input through a camera apparatus according to an embodiment of the present invention.
Figure 6B:
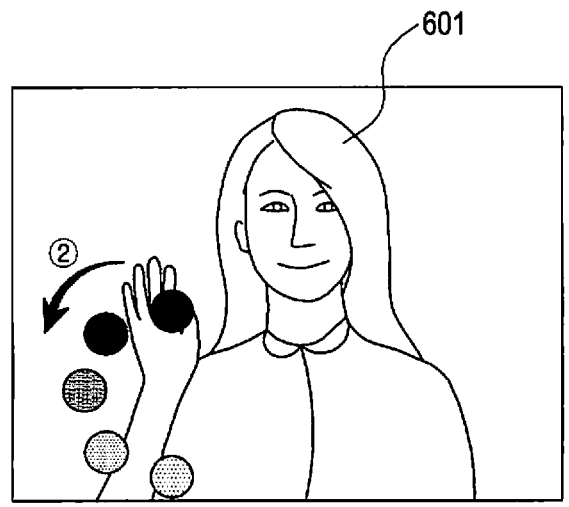

FIGS. 6A and 6B are illustrate gestures of a subject for photography input through the camera apparatus according to an embodiment of the present invention.

Referring to FIG. 6A, a subject 601 for photography draws a straight line in a direction of arrow ① by using a right hand. Referring to FIG. 6B, the subject 601 for photography draws a circle in a direction of arrow ②. FIG. 6A is the linear gesture and FIG. 6B is the circular gesture. The subject for photography may input a command for controlling the camera apparatus 100 by performing the gestures corresponding to the gesture UIs as illustrated in FIGS. 6A and 6B.

Figure 7:
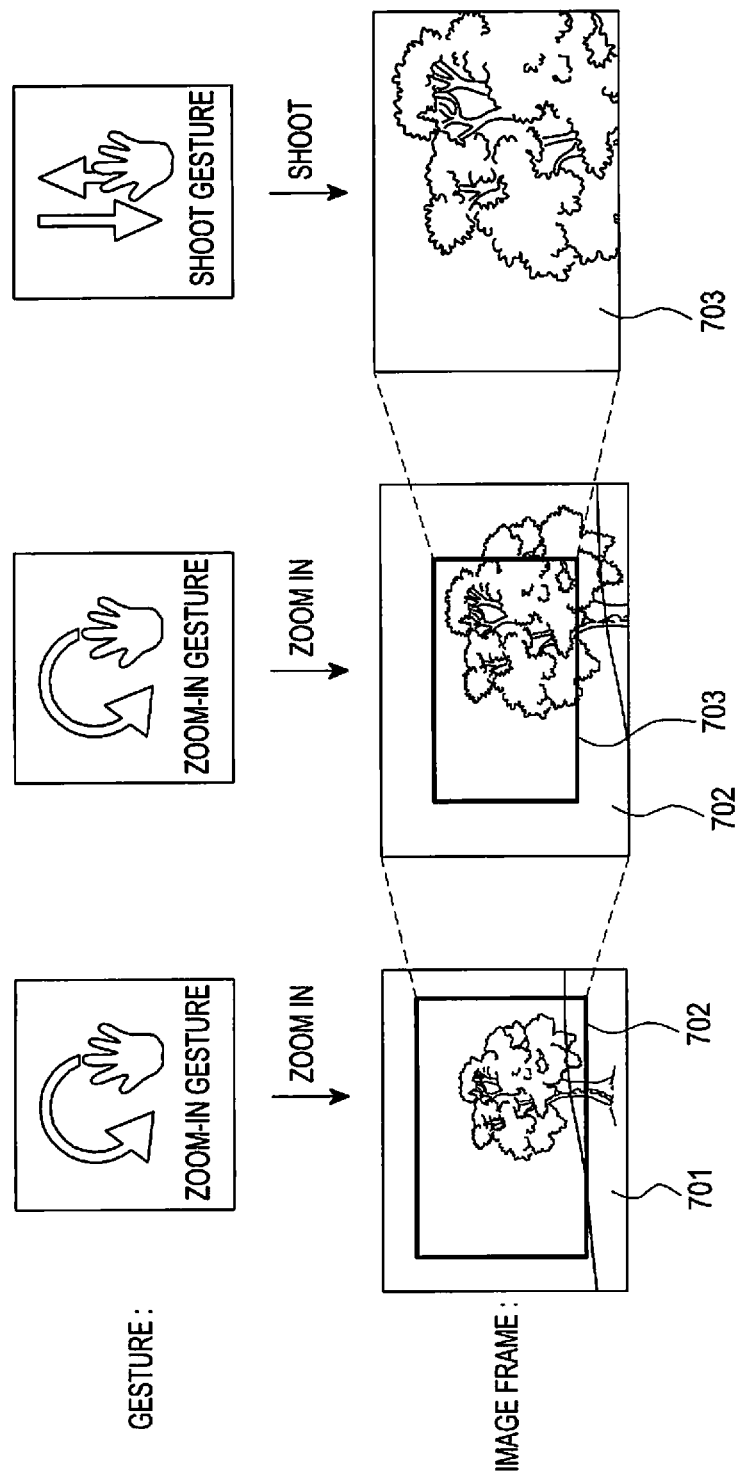
FIG. 7 illustrates an image input to a camera according to a sequence of a gesture UI input according to an embodiment of the present invention.

FIG. 7 is illustrates an image input to a camera according to an order of a gesture UI input according to an embodiment of the present invention.

Referring to FIG. 7, a subject for photography inputs a zoom-in gesture in the camera apparatus 100 twice in a time sequence and then inputs a shoot gesture once. When the first zoom-in gesture is input, the camera apparatus 100 generates a second frame 702 by zooming in on a center of a first frame 701. When the second zoom-in gesture is input, the camera apparatus 100 generates a third frame 703 by zooming in on a center of the second frame 702.

In the present embodiment, a case in which the center portion of the image input through the camera 110 is zoomed in when the zoom-in gesture is input has been described, but the camera apparatus 100 may zoom in or zoom out a desired portion of the user depending on an embodiment. The user may make a request for zoom-in or zoom-out to the camera apparatus 100 by pressing a portion desired to be zoomed in or zoomed out in the image frame (for example, the first frame F1) displayed through the display unit 154 with a finger. The camera apparatus 100 may receive the request of the user and display the portion pressed by the finger of the user on the display unit 154 again by zooming in or zooming out the pressed portion.

Figure 8A:
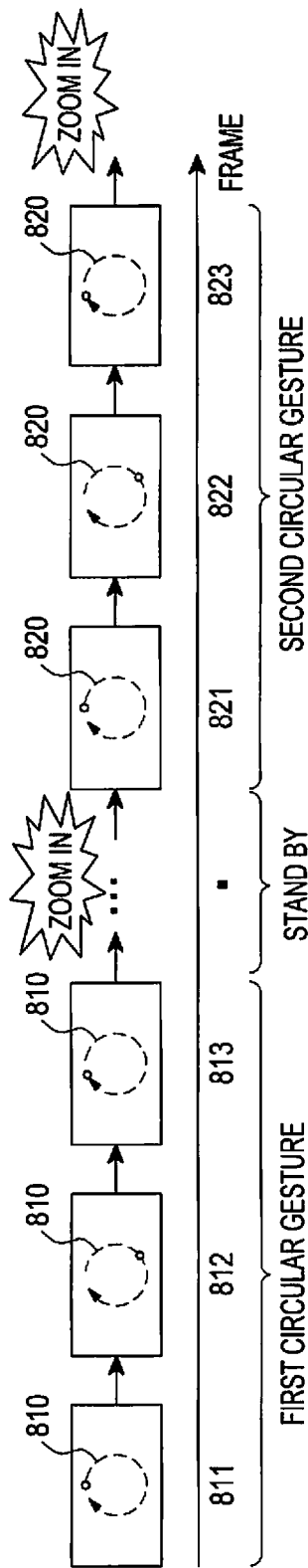
FIGS. 8A and 8B illustrate a method of inputting a gesture UI in a camera apparatus according to an embodiment of the present invention.
Figure 8B:
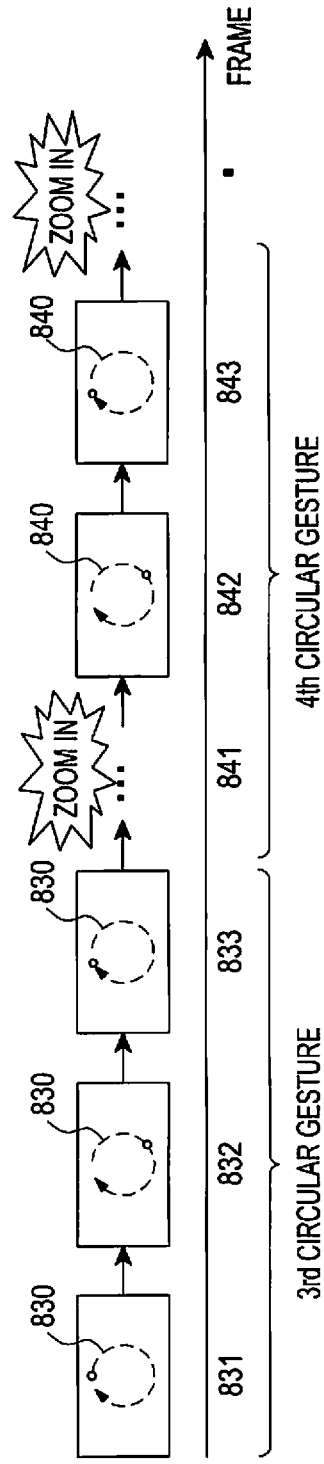

FIGS. 8A and 8B illustrate a method of inputting a gesture UI in a camera apparatus according to an embodiment of the present invention.

FIG. 8A illustrates an input of a first circular gesture 810, and then after a momentary standby time, an input of a second circular gesture 820. FIGS. 8A and 8B illustrate the reception of one gesture UI through three image frames.

Referring to FIG. 8A, the camera apparatus 100 receives an image corresponding to an $11^{th}$ frame 811, a $12^{th}$ frame 812, and a $13^{th}$ frame 813 through the camera 110, and simultaneously receives the first circular gesture 810 from a user or a subject for photography. When the first circular gesture 810 is completely input, the camera apparatus 100 executes the zoom-in operation that is an operation corresponding to the first circular gesture 810. The camera 110 stands by without receiving the gesture UI during the execution of the zoom-in operation in FIG. 8A. When the zoom-in operation is completed, the camera 110 receives the second circular gesture 820. The second circular gesture 820 is also input through three image frames, that is, a $15^{th}$ frame 821, a $16^{th}$ frame 822, and a $17^{th}$ frame 823, similar to the first circular gesture 810. When the second circular gesture 820 is input, the camera apparatus 100 executes the zoom-in operation. Further, the camera 100 stands by without receiving a separate gesture UI during the execution of the zoom-in operation.

Referring to FIG. 8B, the camera apparatus 100 receives a third circular gesture 830 from a user or a subject for photography during the input of an image corresponding to each of a $31^{st}$ frame 831, a $32^{nd}$ frame 832, a $33^{rd}$ frame 833 through the camera 110. When the third circular gesture 830 is completely input, the camera apparatus 100 executes the zoom-in operation that is an operation corresponding to the third circular gesture 830. The camera 110 may receive the gesture UI during the execution of the zoom-in operation in FIG. 8B. Accordingly, the camera apparatus 100 simultaneously executes the zoom-in operation and receives an image corresponding to a $41^{th}$ frame 841 (not shown). Further, the camera apparatus 100 continuously receives images corresponding to a $42^{nd}$ frame 842 and a $43^{rd}$ frame 843 through the camera 110 after the execution of the zoom-in operation. When a fourth circular gesture 840 is input through a $41^{th}$ frame 841, a $42^{nd}$ frame 842, and a $43^{rd}$ frame 843, the camera apparatus 100 executes the zoom-in operation corresponding to the fourth circular gesture 840.

As described above, the camera apparatus 100 according to the present invention may simultaneously receive a gesture UI and execute an operation corresponding to a previous gesture UI input in a previous time. Further, only when one gesture UI is completely input does the camera apparatus 100 execute an operation corresponding to a corresponding gesture UI and receive a next gesture UI. Whether to simultaneously receive a gesture UI and execute an operation corresponding to the gesture UI may be determined according to the user's input through the user input unit 152.

FIGS. 9A to 9D are illustrate gestures of a subject for photography input through the camera apparatus according to another embodiment of the present invention.

All of FIGS. 9A to 9D illustrate image frames for a subject for photography performing a movement corresponding to the zoom-in gesture for executing a zoom-in operation among the circular gestures.

Figure 9A:
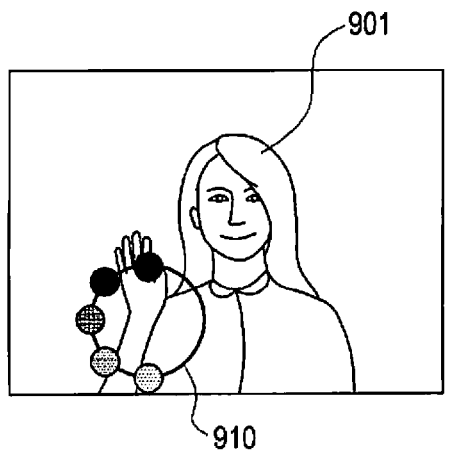
FIGS. 9A to 9D illustrate gestures of a subject for photography input through a camera apparatus according to another embodiment of the present invention.
Figure 9B:
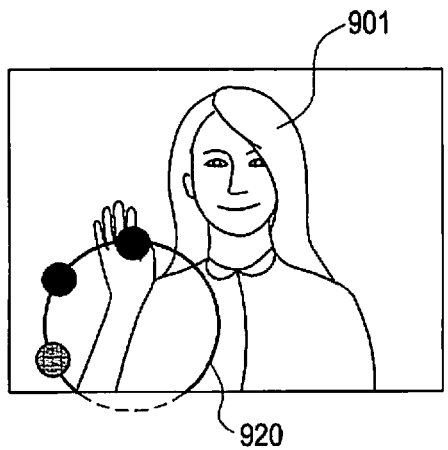

As illustrated in FIG. 9A, when the subject for photography 901 performs the zoom-in gesture (first gesture), the camera apparatus 100 generates an image frame illustrated in FIG. 9B by performing the zoom-in operation (first zoom-in). When a zoom-in gesture (second gesture) is input again as illustrated in FIG. 9B in the state where the first zoom-in by the first gesture has already been executed, a part of the subject for photography 901 making the second gesture by the first zoom-in (i.e., a trace of a hand of the subject for photography) leaves an angle of view of the camera 100 due to the previous zoom-in operation. In FIG. 9B, a lower end of a circle drawn by the subject for photography 901 leaves the angle of view of the camera 110 and is not recognized by the camera 110. Accordingly, the camera apparatus 100 according to the present invention accurately detects the movement performed by the subject for photography 901 by predicting a movement trace of the subject for photography 901 with respect to the part outside of the angle of view of the camera 110.

Figure 9C:
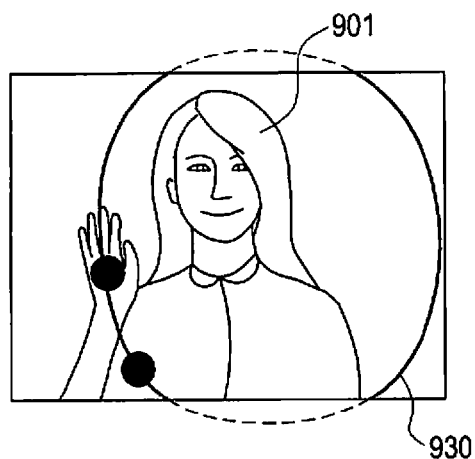
Figure 9D:
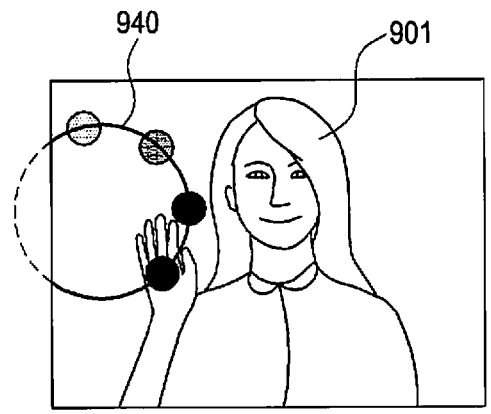

FIGS. 9C and 9D illustrate image frames for the subject for photography performing the zoom-in gesture.

In the image frames of FIGS. 9C and 9D, a portion of the zoom-in gesture performed by the subject for photography 901 is outside the angle of view of the camera 110 similar to FIG. 9B. Accordingly, the gesture recognition unit 120 of the camera apparatus 100 detects a gesture UI desired to be input in the camera apparatus 100 by the subject for photography 901 by predicting the movement trace of the subject for photography 901.

Figure 10:
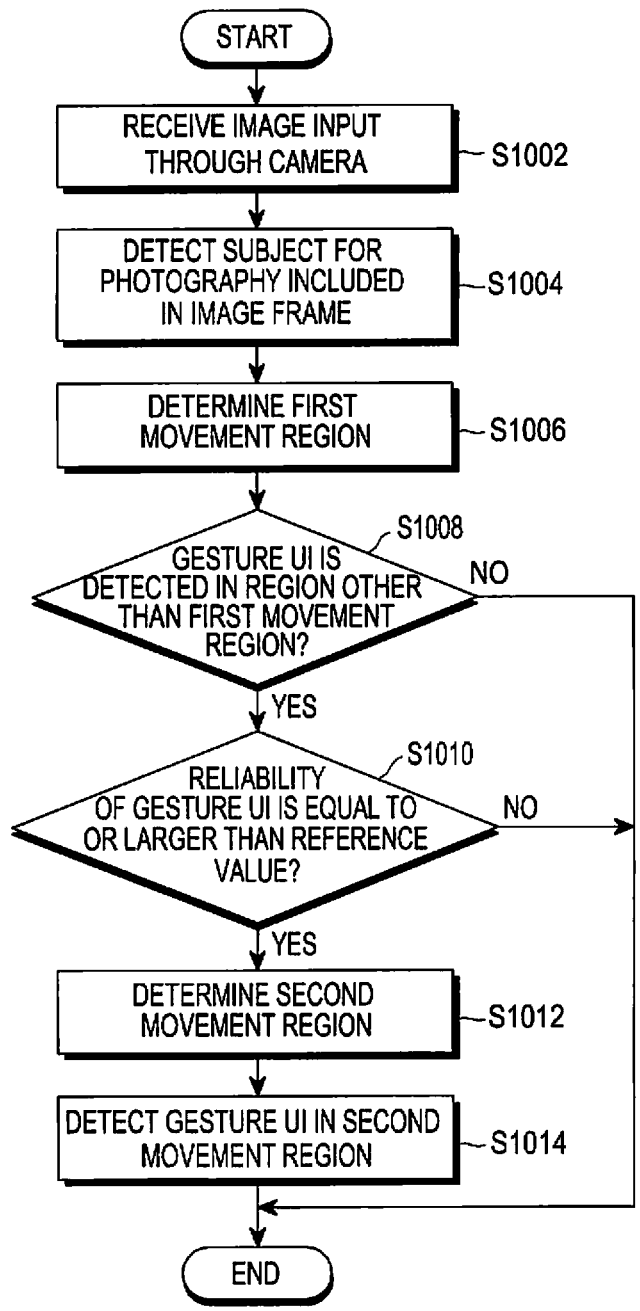
FIG. 10 is a flowchart illustrating another embodiment of a method of controlling the camera apparatus illustrated in FIG. 1.

FIG. 10 is a flowchart illustrating another method of controlling the camera apparatus shown in FIG. 1.

Referring to FIG. 10, the camera apparatus 100 receives an image input through the camera 110 in step S1002. The camera 110 generates an image frame by using the image input in step S1002, and transmits the generated image frame to the gesture recognition unit 120.

In step S1004, the gesture recognition unit 120 detects a subject for photography included in the image frame. Further, the gesture recognition unit 120 detects a movement of the subject for photography detected in step S1004 by comparing a current frame with at least one previous frame. As described above, the controller determines a first movement region by detecting the movement of at least part of the subject for photography in step S1006 (S1006).

In the embodiment, the movement region refers to a region in which the subject for photography performs an operation corresponding to at least one gesture UI. For example, the movement region may be a region in which the subject for photography moves both hands. The controller 140 according to the embodiment controls the gesture recognition unit 120 to recognize only a gesture detected in the movement region as the gesture UI and receives the recognized gesture. As described above, by recognizing only the movement detected in the movement region as the gesture UI, the time required for recognizing the gesture UI can be reduced. Further, the controller 140 controls the gesture recognition unit 120 to ignore an unnecessary movement of the subject for photography detected in a region other than the movement region as noise and thus efficiently recognize the gesture UI.

After the first movement region is determined as described above, the controller 140 determines whether the gesture UI is detected in regions other than the first movement region in step S1008.

When, in step S1008, it is determined that the gesture is not detected in the regions other than the first movement region (S1008: no), the controller 140 does not perform any operation. According to the embodiment, the gesture recognition unit 120 of the camera apparatus 100 continuously recognizes the movement of the subject for photography in the first movement region as the gesture UI.

When, in step S1008, it is determined that the gesture UI is detected in the regions other than the first movement region (S1008: yes), the controller 140 determines whether reliability of the gesture UI is equal to or larger than a reference value in step S1010.

When, in step S1010, it is determined that the reliability of the gesture UI is equal to or larger than the reference value (S1010: yes), the controller 140 identifies the region where the gesture UI is detected as a second movement region in step S1012. When the second movement region is determined, the gesture recognition unit 120 first identifies the gesture detected in the second region as the gesture UI. As described above, the gesture recognition unit 120 detects the gesture UI generated in the second movement region in step S1014.

When, in step S1010, it is determined that the reliability of the gesture UI is less than the reference value (S1010: no), the controller 140 can maintain a current state without performing any operation.

According to the embodiment, the controller 140 compares reliability of the gesture UI detected in the first movement region with reliability of the gesture UI detected in the regions other than the first movement region and identifies the region having the higher reliability as the second movement region.

Figure 11:
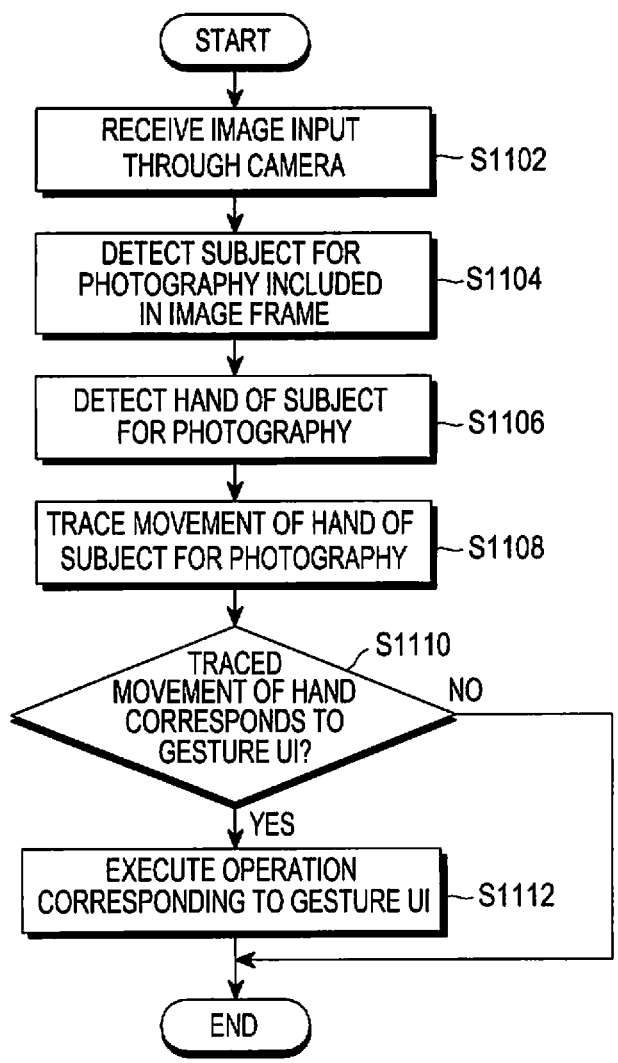
FIG. 11 is a flowchart illustrating yet another embodiment of a method of controlling the camera apparatus illustrated in FIG. 1.

FIG. 11 is a flowchart illustrating still another method of controlling the camera apparatus shown in FIG. 1.

Referring to FIG. 11, the camera apparatus 100 receives an image input through the camera 110 in step S1102. The camera 110 generates an image frame by using the image input in step S1102, and transmits the generated image frame to the gesture recognition unit 120.

In step S1104, the gesture recognition unit 120 detects a subject for photography included in the image frame. In step S1106, the gesture recognition unit 120 detects a hand of the subject for photography. In the embodiment, the camera apparatus 100 receives a gesture UI from the subject for photography by performing hand tracking of the subject for photography in real time. In the embodiment, the memory 130 of the camera apparatus 100 stores various data on the hand of the subject for photography such as, for example, information on an image, a size, a shape, and an outline of the hand. According to the embodiment, before the performance of the method illustrated in FIG. 11, an image photographed from the hand of the subject for photography may be pre-stored in the memory 130.

Accordingly, in step S1108, the camera 110 of the camera apparatus 100 traces a movement of the hand of the subject for photography. The controller 140 determines whether a movement of the traced hand corresponds to the gesture UI in step S1110. At this time, the gesture UIs and the operations or commands corresponding to the gesture UIs, as illustrated in FIGS. 5A to 5D, may be pre-stored in the memory 130. The controller 140 determines whether at least one of the gesture UIs stored in the memory 130 matches the movement of the hand traced in step S1108. When the movement of the hand matches one of the stored gesture UIs, the controller 140 can determine the movement of the hand as the gesture UI.

When, in step S1110, it is determined that the movement of the hand corresponds to the gesture UI (S1110: yes), the controller 140 controls the camera apparatus 100 to perform the operation corresponding to the gesture UI in step S1112.

When, in step S1110, it is determined that the movement of the hand does not correspond to the gesture UI (S1110: no), the controller 140 controls the camera apparatus 100 to standby without performing any operation.

Figure 12:
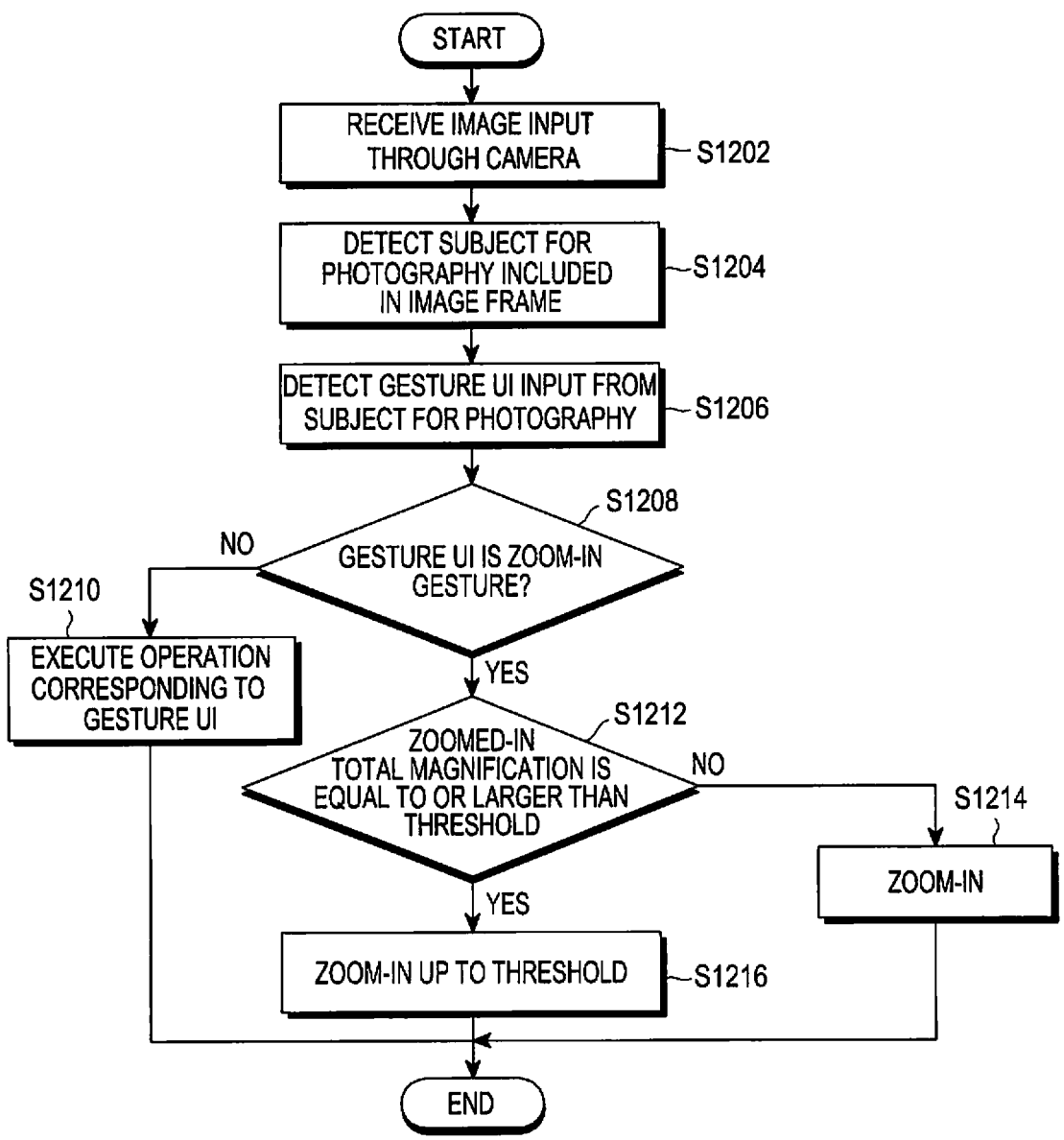
FIG. 12 is flowchart illustrating another embodiment of a method of controlling the camera apparatus illustrated in FIG. 1.

FIG. 12 is a flowchart illustrating yet another method of controlling the camera apparatus shown in FIG. 1.

Referring to FIG. 12, the camera apparatus 100 receives an image input through the camera 110 in step S1202. The camera 110 generates an image frame by using the image input in step S1202, and transmits the generated image frame to the gesture recognition unit 120.

In step S1204, the gesture recognition unit 120 detects a subject for photography included in the image frame. Further, the gesture recognition unit 120 compares a current frame with at least one previous frame and detects a movement of the subject for photography detected in step S1204. When the subject for photography and the movement of the subject for photography are detected, the gesture recognition unit 120 detects a gesture UI input from the subject for photography in step S1206.

In step S1208, the controller 140 determines whether the gesture UI detected in step S1206 is a zoom-in gesture.

When, in step S1208, it is determined that the detected gesture UI is not the zoom-in gesture (S1208: no), the controller 140 controls the camera apparatus 100 to perform an operation corresponding to the gesture UI detected in step S1206 (step S1210). At this time, the gesture UI may be, for example, a zoom-out gesture, a shoot gesture, or a shoot mode change gesture.

When, in step S1208, it is determined that the detected gesture UI is the zoom-in gesture (S1208: yes), the controller 140 determines whether a zoomed-in total magnification is greater than or equal to a threshold (i.e., a threshold magnification) in step S1212. When, in step S1212, it is determined that the zoomed-in total magnification is less than the threshold (S1212: no), the controller 140 controls the camera apparatus 100 to perform the zoom-in operation in step S1214.

When, in step S1212, it is determined that the zoomed-in total magnification is greater than or equal to the threshold (S1212: yes), the controller 140 controls the camera apparatus 100 to perform the zoom-in operation up to the threshold in step S1216.

According to the embodiment, when a movement trace of the subject for photography input through the camera 110 is outside of the image input through the camera (i.e., when the movement trace is outside of an angle of view of the camera 110), the controller 140 determines that the current magnification has reached the threshold.

Figure 13:
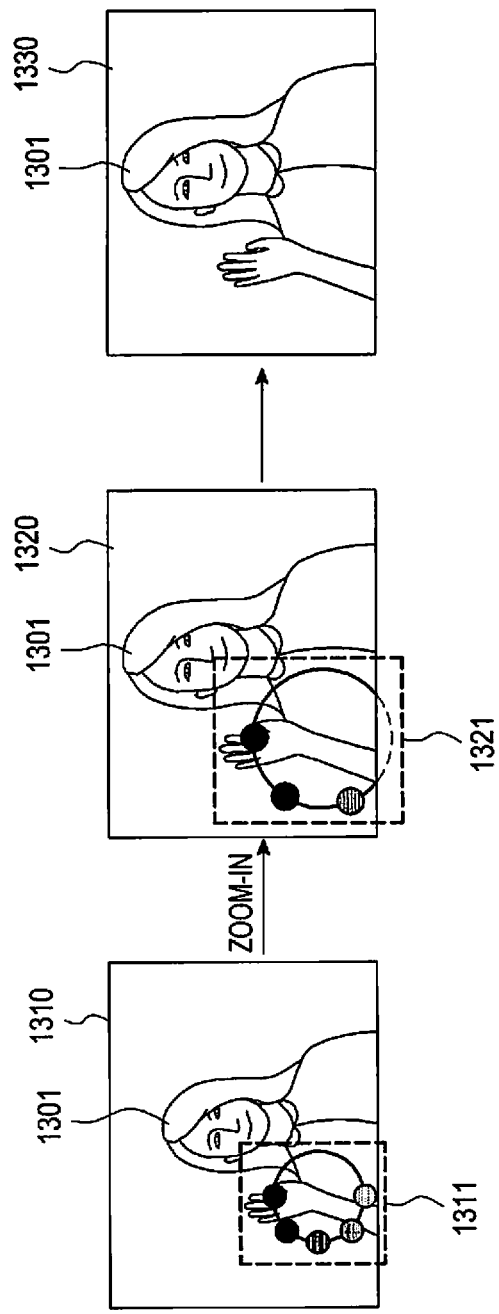
FIG. 13 illustrates a gesture UI of a subject for photography input through a camera apparatus according to another embodiment of the present invention.

FIG. 13 illustrates a gesture UI of a subject for photography input though the camera apparatus according to another embodiment of the present invention. It is assumed that the camera apparatus 100 of FIG. 13 receives only a zoom-in gesture from a subject 1301 for photography through the camera 110.

Referring to FIG. 13, in a first frame 1310 generated by the camera 110, a first zoom-in gesture 1311 is input to the camera 110 by the subject for photography 1301. The camera apparatus 100 performs the zoom-in operation by receiving the first zoom-in gesture, and the camera 110 generates a second frame 1320 according to the performance of the zoom-in operation. At this time, it is assumed that a zoom-in magnification of the camera apparatus 100 reaches the threshold.

The subject for photography in the second frame 1320 inputs a zoom-in gesture (i.e., a second zoom-in gesture) 1321 to the camera apparatus 100 similar to the first frame 1310. However, since the zoom-in magnification of the camera apparatus 100 has already reached the threshold, the camera apparatus 100 does not perform the further zoom-in operation. Therefore, a third frame 1330 generated by the camera 110 has the same magnification as that of the second frame 1320.

For example, it is assumed that the subject for photography 1301 of the first frame 1310 makes a request for a 3× zoom-in of the lens to the camera apparatus 100 by inputting the first zoom-in gesture 1311 to the camera apparatus 100. After the lens is 3× zoomed-in, the subject for photography 1301 inputs the second zoom-in gesture 1321 which is the same as the first zoom-in gesture 1311 to the camera apparatus 100, so that the request for the 3× zoom-in of the lens is made again to the camera apparatus 100.

When it is assumed that an enlargement magnification or reduction magnification of the camera apparatus 100 corresponds to a sum of a previous magnification and a current magnification, a total magnification in FIG. 13 totally becomes 6× according to the magnification corresponding to each of the first zoom-in gesture and the second zoom-in gesture. That is, the subject for photography 1301 makes a request for a six times zoom-in to the camera apparatus 100 by successively inputting the first zoom-in gesture 1311 and the second zoom-in gesture 1321 to the camera apparatus 100.

At this time, it is assumed that an available zoom-in threshold of the camera apparatus 100 illustrated in FIG. 13 (i.e., a threshold magnification) is 3×. That is, it is assumed that the camera apparatus 100 performs the zoom-in operation up to 3×. Since the second frame 1320 corresponds to a frame generated in a state of reaching the threshold, the camera apparatus 100 does not perform the further zoom-in operation. Referring to FIG. 13, after the second frame 1320 is generated, the camera apparatus 100 does not perform the zoom-in operation. Accordingly, the third frame 1330, generated by the camera apparatus 100 after the second zoom-in gesture 1321 input to the camera apparatus 100 while the second frame 1320 is generated is input, has the same magnification as that of the second frame 1320.

According to the embodiment, the controller 140 of the camera apparatus 100 prevents the camera apparatus 100 from performing the further zoom-in operation even when the trace of the gesture UI input from the subject for photography is outside of the frames 1310, 1320, and 1330. Referring to second frame 1320, the second zoom-in gesture 1321 input by the subject for photography is outside of a range of the second frame 1320. Accordingly, the controller 140 controls the camera apparatus 100 to prevent the further zoom-in operation. Since the camera apparatus 100 cannot perform the zoom-in operation any more, the camera apparatus 100 generates the third frame 1330 having the same magnification as that of the second frame 1320.

It may be appreciated that the method of controlling the camera apparatus according to the embodiments of the present invention can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present invention appropriately include equivalents thereto.

Further, the camera apparatus can receive the program from a program providing apparatus connected to the camera apparatus wirelessly or through a wire and store the received program. The program providing apparatus may include a memory for storing a program containing instructions for allowing the camera apparatus to perform a preset content protecting method and information required for the content protecting method, a communication unit for performing wired or wireless communication with the camera apparatus, and a controller for transmitting the corresponding program to the camera apparatus according to a request of the camera apparatus or automatically.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for controlling an operation in an electronic device including a photographing unit, comprising:
    comparing frame data between a current frame and one or more previous frames generated from the photographing unit, wherein the frame data includes contour lines, chroma, and colors;
    determining a movement trace of a subject included in the current frame and the one or more previous frames, based on a result of the comparing; and
    determining the movement trace as a gesture of the subject, wherein the gesture is for controlling the photographing unit; and
    executing an operation corresponding to the gesture,
    wherein executing the operation corresponding to the gesture comprises:
    if the operation corresponding to the gesture is a zoom-in operation, determining whether the gesture is at least partially outside of an angle of view of the photographing unit; and
    if the gesture is at least partially outside of the angle of view of the photographing unit, controlling the photographing unit to perform the zoom-in operation up to a pre-stored threshold magnification.

2. The method of claim 1, wherein executing the operation corresponding to the gesture further comprises executing the operation when the gesture is equal to one of a plurality of pre-stored gestures.

3. The method of claim 1, wherein the operation corresponding to the gesture comprises at least one of the zoom-in operation, zoom-out, shoot, shutter speed adjustment, ISO increase/decrease, and selection of a shoot mode.

4. The method of claim 1, further comprising:
    determining a first region, in which a first movement of the subject has a movement degree equal to or greater than a reference value, as a movement region, based on the result of the comparing, wherein a movement within the movement region is input as the gesture for controlling the photographing unit.

5. The method of claim 4, further comprising:
    if first reliability of the first movement in the first region is smaller than second reliability of a second movement in a second region, identifying in the second region as the movement region.

6. The method of claim 1, wherein determining the movement trace of the subject comprises detecting a movement of a hand included in the current frame and the one or more previous frames; and
    wherein determining the movement trace as the gesture of the subject comprises identifying the movement of the hand as the gesture.

7. The method of claim 6, wherein executing the operation corresponding to the gesture further comprises:
    if the operation corresponding to the gesture is the zoom-in operation, calculating a total magnification that applies a magnification corresponding to the zoom-in operation to the photographing unit;
    determining whether the total magnification exceeds a pre-stored threshold magnification; and
    if the total magnification exceeds the pre-stored threshold magnification, controlling the photographing unit to perform the zoom-in operation up to the pre-stored threshold magnification.

8. An electronic device, comprising:
    a photographing unit configured to generate an image; and
    a processor configured to:
    compare frame data between a current frame and one or more previous frames generated from the photographing unit, wherein the frame data includes contour lines, chroma, and colors,
    determine a movement trace of a subject included in the current frame and the one or more previous frames, based on a result of the comparing,
    determine the movement trace as a gesture of the subject, wherein the gesture is for controlling the photographing unit, and
    execute an operation corresponding to the gesture,
    wherein the processor is further configured to:
    if the operation corresponding to the gesture is a zoom-in operation, determine whether the gesture is at least partially outside of an angle of view of the photographing unit, and
    if the gesture is at least partially outside of the angle of view of the photographing unit, control the photographing unit to perform the zoom-in operation up to a pre-stored threshold magnification.

9. The electronic device of claim 8, further comprising:
    a memory configured to store a plurality of gestures and operations corresponding to each of a plurality of the gestures.

10. The electronic device of claim 9, wherein the processor is further configured to:
    determine whether the gesture is equal to one of the plurality of the gestures stored in the memory, and
    execute the operation corresponding to the gesture.

11. The electronic device of claim 8, wherein the operation corresponding to the gesture comprises at least one of the zoom-in operation, zoom-out, shoot, shutter speed adjustment, ISO increase/decrease, and selection of a shoot mode.

12. The electronic device of claim 8, wherein the processor is further configured to:
    determine a first region, in which a first movement of the subject has a movement degree greater than or equal to a reference value, as a movement region, based on the result of the comparing, wherein a movement within the movement region is input as the gesture for controlling the photographing unit.

13. The electronic device of claim 12, wherein the processor is further configured to, if first reliability of the first movement in the first region is smaller than second reliability of a second movement in a second region, identify the second region as the movement region.

14. The electronic device of claim 8, wherein the processor is further configured to:
    detect a movement of a hand included in the current frame and the one or more previous frames, and
    identify the movement of the hand as the gesture.

15. The electronic device of claim 8, wherein the processor is further configured to:
    calculate a total magnification that applies a magnification corresponding to the zoom-in operation to the photographing unit when the operation corresponding to the gesture is the zoom-in operation,
    determine whether the total magnification exceeds a pre-stored threshold magnification, and
    control the photographing unit to perform the zoom-in operation up to the pre-stored threshold magnification when the total magnification exceeds the pre-stored threshold magnification.

* * * * *